(12) United States Patent
Lordahl et al.

(10) Patent No.: US 7,108,011 B1
(45) Date of Patent: Sep. 19, 2006

(54) SELF CLOSING MIXING CARTRIDGE FOR SINGLE HANDLE CARTRIDGE TYPE FAUCET

(75) Inventors: Var Lordahl, 1571 Schaeffer Rd., Long Grove, IL (US) 60047; Scott H. Koepsel, Winthrop Harbor, IL (US)

(73) Assignee: Var Lordahl, Long Grove, IL (US)

( * ) Notice: Subject to any disclaimer, the term of this patent is extended or adjusted under 35 U.S.C. 154(b) by 299 days.

(21) Appl. No.: 10/778,811

(22) Filed: Feb. 13, 2004

(51) Int. Cl.
*F16F 11/078* (2006.01)

(52) U.S. Cl. ............................. 137/625.17; 137/625.4; 251/324

(58) Field of Classification Search .......... 137/625.17, 137/625.4; 251/324
See application file for complete search history.

(56) References Cited

U.S. PATENT DOCUMENTS

| | | | | |
|---|---|---|---|---|
| 3,943,970 A | * | 3/1976 | Knapp | 137/597 |
| 3,958,792 A | * | 5/1976 | Barkelew | 251/304 |
| 4,165,857 A | * | 8/1979 | Morris et al. | 251/54 |
| 4,241,759 A | * | 12/1980 | Billeter | 137/636.4 |
| 4,457,452 A | * | 7/1984 | Symmons | 222/20 |
| 4,768,553 A | * | 9/1988 | Marx | 137/625.17 |
| 4,784,368 A | * | 11/1988 | Koch et al. | 251/51 |
| 4,973,025 A | * | 11/1990 | Iqbal | 251/48 |
| 5,103,857 A | * | 4/1992 | Kuhn et al. | 137/315.13 |
| 5,526,845 A | * | 6/1996 | Manos | 137/625.17 |
| 5,927,328 A | * | 7/1999 | Nelson et al. | 137/624.12 |
| 2004/0144944 A1 | * | 7/2004 | Roethel et al. | 251/240 |

* cited by examiner

*Primary Examiner*—Eric Keasel
*Assistant Examiner*—Craig M. Schneider
(74) *Attorney, Agent, or Firm*—Kajane McManus

(57) ABSTRACT

A self closing cartridge for a single handle faucet includes a casing having a piston therein which is held in a normally closed, up position by water pressure. There are seal members positioned to form a seal between the sleeve and the casing. Further, a spring is incorporated to assist the hydraulic self closure of the cartridge by raising the piston to a normally closed position under low water pressure conditions and to mechanically shear and digest any deposited matter in the area of the spring.

13 Claims, 2 Drawing Sheets

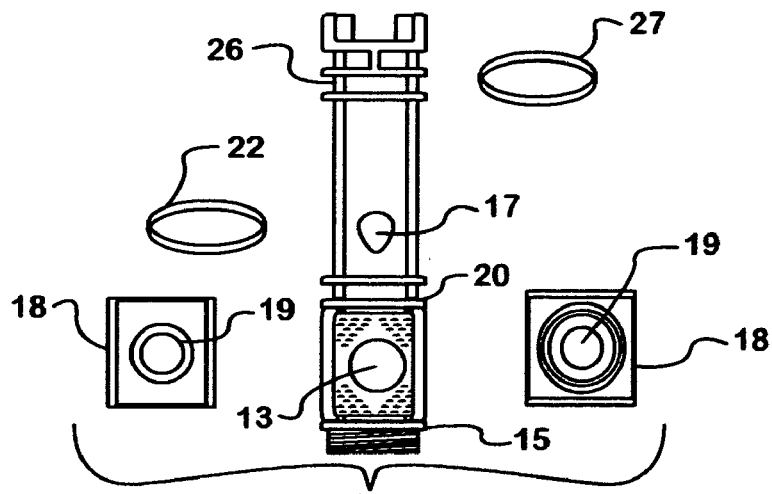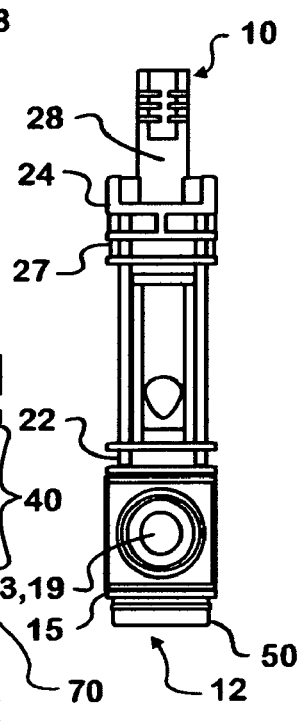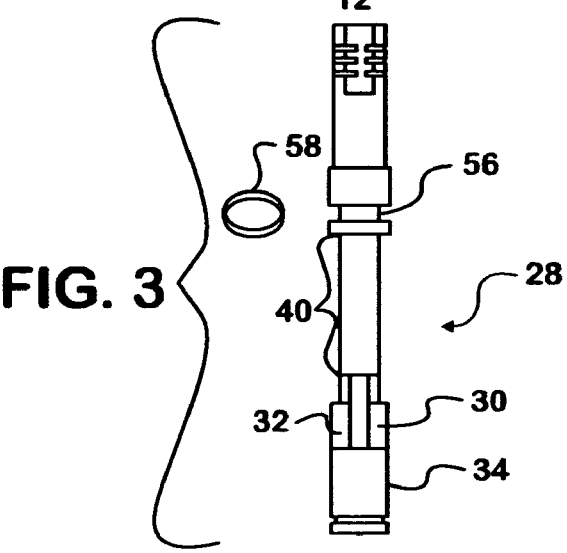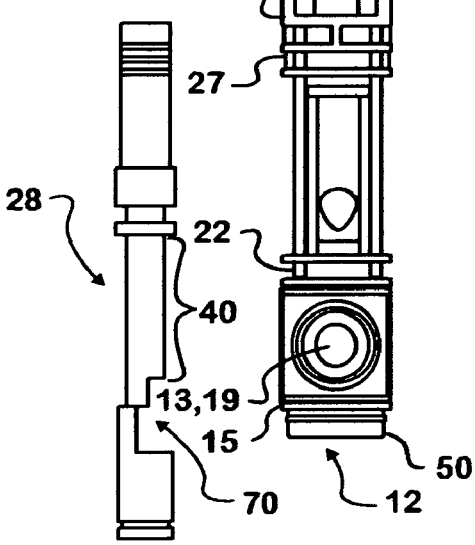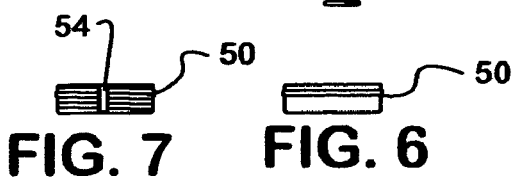

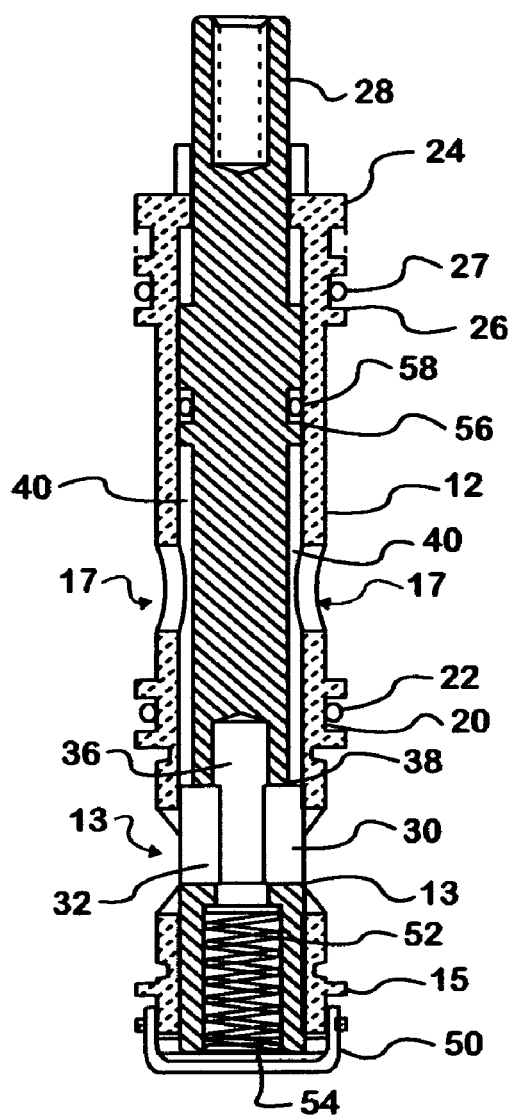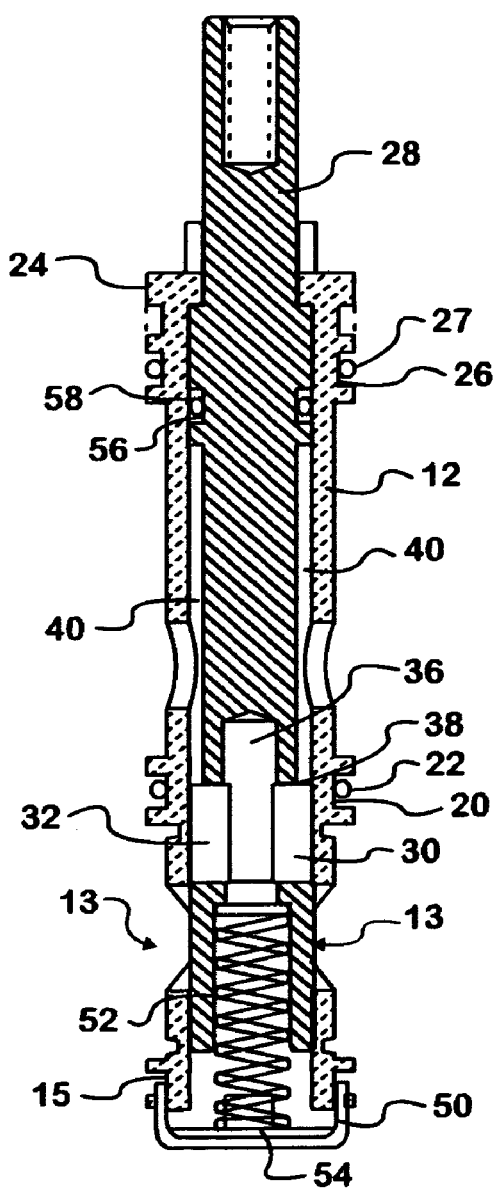

SELF CLOSING MIXING CARTRIDGE FOR SINGLE HANDLE CARTRIDGE TYPE FAUCET

BACKGROUND OF THE INVENTION

1. Field of the Invention

The present invention relates to a self closing mixing cartridge for a single handle cartridge type faucet. The cartridge uses hydraulic and mechanical structure for assuring self closure. Specifically, available water pressure is used to hydraulically lift the piston inside the cartridge up to a full time closed position while assisting the hydraulic lift with an uplift mechanical spring in low water pressure situations. In short, unless a user holds the cartridge down in an on or open position, the cartridge will rise and self close.

2. Prior Art

In order to save water/gas/sewage and the environment, city and national codes are beginning to demand auto or self closing faucets in commercial/institutional applications, although private individuals desiring to really save water etc., will also have access to the product.

One of the most common of all such faucets, with millions in use throughout the world is produced by the Moen Company of North Olmstead, Ohio.

Moen provides a single cartridge which will fit nearly all of its faucets available since approximately 1959. The cartridge of the present invention can replace all such standard factory model cartridges.

With the standard Moen model a user pulls up for on and turns the handle left/right to get hot/cold water or a mixture thereof. With the herein proposed self closing cartridge, a user pushes down for on and adjusts temperature as above.

The self closing cartridge is very marketable, of low cost and believably functional.

A new handle cap to fit the cartridge operating handle will be provided and will state "PUSH FOR ON", ETC. for easy public education on how to use this new self closing cartridge.

SUMMARY OF THE INVENTION

According to the invention there is provided a self closing cartridge for a single handle faucet comprising a casing and a substantially solid piston within the casing, the improvement comprising: the piston being made of corrosion resistant metal alloy or of a very high temperature ultra lubricated plastic resin; and a biasing spring inserted between the piston and a bottom end of the casing to assist hydraulic self closure of the cartridge and to mechanically shear away and mechanically digest any contaminant deposits in the area of the spring.

Further, according to the invention there is provided a method of using a self closing cartridge for a single handle faucet comprising a casing and a piston within the casing, the improvement comprising: the piston being made of a corrosion resistant metal alloy or very high temperature ultra lubricated plastic resin; and a biasing spring inserted between the piston and a bottom end of the casing to assist hydraulic self closure of the cartridge and to mechanically shear away and mechanically digest any contaminant deposits in the area of the spring; comprising the steps of: pushing down on the faucet handle to begin a flow of water therethrough; holding the handle down to continue the flow of water; and releasing the handle so the cartridge self closes.

BRIEF DESCRIPTION OF THE DRAWINGS

FIG. 1 is a perspective view of the self closing cartridge of the present invention.

FIG. 2 is a perspective exploded view of a casing for the cartridge.

FIG. 3 is a perspective exploded view of the piston of the cartridge.

FIG. 4 is a sideview of the cartridge showing an offset therein in an inlet area thereof.

FIG. 5 is a perspective view of a spring of the cartridge.

FIG. 6 is a perspective view of an end cap of the cartridge.

FIG. 7 is a cross sectional view of an end cap of the cartridge.

FIG. 8 is a cross sectional view of the assembled cartridge in the down "open" position.

FIG. 9 is a cross sectional view of the assembled cartridge in the up "closed" position.

DESCRIPTION OF THE PREFERRED EMBODIMENT

For environmental reasons and to save money, a water faucet that automatically closes once a user releases the handle is desirable.

Since before 1960, the single handle cartridge type Moen® faucet has been in wide use across the US, Canada and other parts of the world. Literally millions are in use today. Such faucet operates such that, once on, it remains on, until the user turns it off. If it is desired to save water by switching to a self closing model, the entire faucet construction must be replaced, which is a very expensive and time consuming job, often requiring professional installation.

The herein proposed cartridge allows a user to convert a Moen® single handle cartridge type faucet to a self closing model without the need of replacing the entire faucet construction, but rather merely requires changing the operating cartridge inside the existing faucet; a simple, inexpensive time saving operation usually not requiring professional assistance.

Historically, faucet manufacturers have offered 3 types of valves or cartridges:

standard models that remain in the "ON" mode unless turned to the "OFF" mode;

self closing models that "instantly" go to the "OFF" mode when the user releases the handle; and slow closing models that return to the "OFF" mode slowly when the user releases the handle, with the timing usually being adjustable.

All models of single handle Moen® faucets primarily using one substantially universal internal cartridge which operates as a standard model as described above can be converted into a self closing model faucet by merely replacing the cartridge therein.

When operating the faucet with a standard model cartridge, a user pulls up on the handle to turn the faucet on; turns the handle left or right for temperature adjustment and pushes the handle down to its original position to turn the faucet off.

If not shut off by the user the faucet remains on.

When operating a faucet with the herein proposed self closing cartridge therein, a user pushes down on the handle to turn the faucet on. When operating a faucet with the self closing cartridge proposed a user releases the handle to automatically shut off the faucet As stated above, to accomplish this, the proposed cartridge uses a combination of hydraulic and mechanical means. Specifically, available water pressure is utilized to hydraulically force a piston inside the cartridge to rise up to a normally closed position with assisting of the lift being accomplished with an uplift mechanical spring under low water pressure conditions. In short, unless a user holds the handle, and thus the cartridge down or on, it will always rise and self close.

This self closing cartridge works like a conventional universal standard model cartridge to the extent that:

it is completely interchangeable;

when the faucet is in the "on" mode water passes from the water lines into a valve casing, passing in through side inlets in the casing and through aligned ports in the side seals, through water paths around a periphery of the piston and back out through outlets of the casing and then out the spout or shower head; when the faucet is in an "off" mode, water passes from the water lines into the valve sleeve and through the inlets in the side seals but its flow is stopped against the piston, sealed by an internal diameter seal portion of each side seal to be defined in greater detail below.

Differences from the prior art are as follows: with the standard cartridge, water pressure is used to keep the faucet on, perpetually, until forced off by the user while with the new self closing cartridge, water pressure perpetually keeps the faucet off by changing the timing of the piston inside the cartridge, raising the piston to a position where the piston seals against communication with the outlet port seals inserted onto and through in the casing, mounting a spring within the bottom of the casing and capturing it by installing a pressure compensating retainer end cap on the bottom of the casing, thereby using the spring to push up on the piston keeping it in an "off" position by virtue of changing of the piston seal location as described above.

When the cartridge is only partially turned on by the user pushing down part way on the handle, water inside the casing is instantly forced beneath the piston, through a hole in a retainer cap and after filling a blind alley inside and surrounding the piston beneath this cap, forcing the sleeve up, turning off the faucet.

The mechanical spring, in addition to applying a secondary preload on the piston, proactively eliminates piston seizure against the casing, by mechanically digesting the mineral particulates and pieces of aqueously carried debris commonly found in water supplies, reducing them down to smaller sizes that will flow freely out of the cartridge before they have a chance to cause a seizure.

Referring now to the drawings in greater detail, there is illustrated in self closing cartridge made in accordance with the teachings of the present invention and generally identified by the reference numeral 10.

The cartridge 10 is comprised of a hollow cylindrical casing 12 having two inlet ports 13 therein positioned diametrically opposite each other toward a bottom end 15 of the casing 12 as well as two outlet ports 17, positioned diametrically opposite each other in an area above the inlet ports 13.

Two side seals 18 are provided which engage over the outer area of the casing 12, over the inlet ports 13 and incorporating inlets ports 19 therein which are in correspondence with the casing inlet ports 13.

In an area between the inlet ports 13 and outlet ports 17, in the casing 12 a groove 20 is provided for engagement of an O-ring 22 therein for assuring no passage of water therepast.

Further, in an upper end area 24 of the casing 12, a second groove 26 is provided for receipt of a second O-ring 27 therein, serving the same function for opposing passage of water therepast.

Referring to FIGS. 8 and 9, received with a hollow interior of the casing 12 is a substantially solid cylindrical piston 28 having diametrically opposed water inlets 30, 32 therein positioned toward a bottom end 34 of the piston 28, a blind passage 36 centrally disposed within a bottom area 38 of the piston 28, and peripherally situated circular, blind alley outlet 40 positioned radially of the centered blind passage 36, which outlets 40 will allow water to flow to the outlet ports 17 in the casing 12 when the piston 28 is positioned to allow water from the casing inlet ports 13 to pass into and throughout the casing outlet ports 17, as will be defined in greater detail below.

Seated on the bottom end 40 of the casing 12 is an end cap 50 which is suitably fixed to the casing 12, such as by threading of same thereonto.

The end cap 50 serves as a seat 50 for a biasing spring 52 which is configured to assist in maintaining the water path from the casing 12 normally out of alignment with the water path through the piston 28, maintaining the cartridge 10 in a normally off or closed position.

The end cap 50 also has a centered inlet 54 therein which keeps water pressure as well as pressure from the spring 52, against the centered blind passage 36 in the piston 28, further maintaining the cartridge 10 in a normally closed position.

The piston 28 also incorporates a peripheral groove 56 extending therearound within which an O-ring 58 is engaged, sealing against passage of water between the piston 28 and the casing 12 in an area above the second peripheral blind alley outlet 40 formed between the piston 28 and casing 12, against which pressure of water from the centered inlet 54 in the cap 50 presses, yet further assisting in returning the piston 28 into a normally closed position.

It will be understood that the cartridge 10 works in an opposite manner to present day cartridges. In this respect, presently available cartridges must have a piston therein in an "up" position for allowing water flow therethrough and, obviously, must be in a "down" position to close off water flow.

In use of the presently herein proposed cartridge 10, the piston 28 must be in an "up" position to close off water flow and in a "down" position to open, allowing water flow.

Although not illustrated, a new faucet cap may be provided, if necessary, to explain to a user this opposite manner of functionality.

Thus, a kit (not shown) which provides the cartridge 10 of the present invention together with an instructional faucet cap (not shown) may be considered to be within the scope of the invention as well, though this should not be construed as limiting.

Turning now to FIG. 4, wherein an offset area 70 is visible on the substantially sold piston 28, it will be understood first that the piston 28 is rotatable within the casing 12, and that a first of the opposed inlet ports 13 in the casing 12 is for hot water and the other is for cold water.

This offset area 70 serves as a mixing valve for control of water temperature, with a turn in a direction toward the hot water inlet port 13 increasing water temperature while a turn toward the cold water inlet port 13 decreases water temperature.

This rotation of the piston 28 is accomplished by engagement of the piston 28 to a rotatable faucet handle (not shown) in known manner and will need no further explanation to those skilled in the art.

It must also be understood that components of the cartridge 10 are constructed or molded from a very high temperature ultra lubricated plastic resin or corrosion resistant metal or metal alloy to substantially eliminate seizure of the cartridge 10 in "bad" water environments, with one preferred material used being PTFE, though this should not be construed as limiting.

As described above the cartridge 10 of the present invention provides a number of advantages, some of which have been described above and others of which are inherent the invention. Also, modifications may be proposed to the cartridge 10 without departing from the teachings herein. Accordingly, the scope of the invention is only to be limited as necessitated by the accompanying claims.

We claim:

1. A self closing cartridge for a single handle faucet comprising a casing and a substantially solid piston within the casing, the improvement comprising:

the piston being molded of a very high temperature ultra lubricated plastic resin or corrosion resistant metal alloy;

the cartridge having diametrically opposed water outlets in the casing and having a water outlet about a periphery of the piston which aligns with the outlets in the casing;

the cartridge further having water inlets in the casing and water inlets in the piston wherein water flows throughout the cartridge when the piston inlets align with the casing inlets; and a biasing spring inserted between the piston and a bottom end of the casing to assist hydraulic self closure of the cartridge and to mechanically shear away and mechanically digest any contaminant deposits in the area of the spring.

2. The cartridge of claim 1 wherein the casing is made of a very high temperature ultra lubricated plastic resin.

3. The cartridge of claim 1 wherein the spring biases the piston away from the bottom end cap to a normally closed position.

4. The cartridge of claim 1 wherein the substantially solid piston is spring biased toward a normally closed position.

5. The cartridge of claim 1 wherein a cap for a faucet indicating the method of using the faucet with the cartridge therein is also provided.

6. The cartridge of claim 1 having a hot water inlet and a cold water inlet in the casing which are disposed diametrically opposite each other.

7. The cartridge of claim 6 wherein the piston rotates within and rises and lowers within the casing.

8. The cartridge of claim 6 having a hot water inlet and a cold water inlet in the piston which are disposed diametrically opposite each other and align with the inlets in the casing when the piston is in a down position, the degree of inlet alignment depending on the rotated position of the piston inlets relative to the position of the casing inlets.

9. The cartridge of claim 1 wherein the piston has a centered blind alley therein.

10. The cartridge of claim 9 wherein an outlet created about a periphery of the piston is an elongate blind alley.

11. The cartridge of claim 10 wherein water pressure exerts a force against each blind alley to cause the piston to rise and close off inlets into the cartridge from inlets into the piston.

12. The cartridge of claim 11 wherein a biasing spring is positioned between a bottom end cap and the piston to assist in returning the piston to a closed position after the faucet is turned on.

13. The cartridge of claim 12 wherein the biasing spring shears contaminants carried by the water off the cartridge in an area adjacent thereto.

* * * * *